United States Patent
Pagan

(10) Patent No.: US 10,897,972 B2
(45) Date of Patent: Jan. 26, 2021

(54) STORAGE DEVICE COMBINATION FOR PENCILS, PENS, AND OTHER STATIONERY DEVICES

(71) Applicant: Luis Javier Pagan, Dublin, OH (US)

(72) Inventor: Luis Javier Pagan, Dublin, OH (US)

(*) Notice: Subject to any disclaimer, the term of this patent is extended or adjusted under 35 U.S.C. 154(b) by 0 days.

(21) Appl. No.: 15/935,682

(22) Filed: Mar. 26, 2018

(65) Prior Publication Data

US 2018/0213904 A1 Aug. 2, 2018

Related U.S. Application Data

(60) Provisional application No. 62/476,994, filed on Mar. 27, 2017.

(51) Int. Cl.
| | | |
|---|---|---|
| *A45C 11/36* | (2006.01) | |
| *A45C 11/34* | (2006.01) | |
| *A45C 15/06* | (2006.01) | |
| *G01B 3/04* | (2006.01) | |
| *B26B 29/02* | (2006.01) | |

(52) U.S. Cl.
CPC .............. *A45C 11/36* (2013.01); *A45C 11/34* (2013.01); *A45C 15/06* (2013.01); *G01B 3/04* (2013.01); *A45C 2200/10* (2013.01); *B26B 29/025* (2013.01)

(58) Field of Classification Search
USPC .................................................. 33/484, 485
See application file for complete search history.

(56) References Cited

U.S. PATENT DOCUMENTS

| | | | |
|---|---|---|---|
| 185,977 A * | 1/1877 | Smith | A45C 11/34 |
| | | | 206/214 |
| 233,203 A * | 10/1880 | Cushman | B65D 51/246 |
| | | | 220/212 |
| 292,909 A | 2/1884 | Haring | |
| 333,088 A | 12/1885 | Turner | |
| 418,870 A * | 1/1890 | Hazlett | B43L 23/006 |
| | | | 30/462 |
| 709,337 A | 9/1902 | Leary | |
| 746,897 A | 12/1903 | Stuart | |
| 766,308 A | 8/1904 | Wilhelm | |
| 827,539 A | 7/1906 | Kohlmeyer | |
| 924,406 A | 6/1909 | Walker | |
| 1,049,137 A | 12/1912 | Orban | |
| 1,063,134 A | 5/1913 | Norris | |
| 1,170,671 A | 2/1916 | Ressler | |
| 1,431,722 A | 10/1922 | Calvento | |
| 1,500,426 A | 7/1924 | Townsend | |
| 1,567,596 A | 12/1925 | Itskin | |
| 1,652,047 A | 12/1927 | Di Rebaylio | |
| 1,689,390 A | 10/1928 | Johnstone | |
| 1,988,903 A | 1/1935 | Krauss | |
| 2,091,603 A | 8/1937 | Lemire | |
| 2,219,596 A * | 10/1940 | Lundquist | B43K 31/00 |
| | | | 211/69.8 |

(Continued)

*Primary Examiner* — Jacob K Ackun
(74) *Attorney, Agent, or Firm* — Renner, Otto, Boisselle & Sklar, LLP

(57) ABSTRACT

A storage device combination may include a scale, a tube having an inner opening within which the scale may be stored, at least one cap that mounts to an end of the scale and to an end of the tube. The storage device may also include a light disposed within a pocket formed in the inner opening of the tube.

15 Claims, 4 Drawing Sheets

(56) References Cited

U.S. PATENT DOCUMENTS

| | | | | |
|---|---|---|---|---|
| 2,423,779 | A | * | 7/1947 | Kahn ........................ B43L 7/005 33/666 |
| 2,438,653 | A | * | 3/1948 | Ware .......................... B43L 7/00 33/483 |
| 2,636,476 | A | | 4/1953 | Milhavet |
| 2,673,399 | A | * | 3/1954 | Raeder ..................... G01B 3/04 33/485 |
| 3,087,250 | A | * | 4/1963 | Blue .......................... B43L 7/08 33/484 |
| 3,568,923 | A | * | 3/1971 | Chapman ................. G06G 1/04 235/70 D |
| 4,495,709 | A | * | 1/1985 | Mainenti ................... G01B 3/04 33/484 |
| 4,573,571 | A | | 3/1986 | Leem |
| 5,479,719 | A | * | 1/1996 | Liu ........................... B43L 7/04 33/449 |
| 6,247,240 | B1 | * | 6/2001 | Economaki ............. G01B 3/006 33/27.03 |
| 8,096,058 | B2 | * | 1/2012 | Wood ........................ G01B 3/04 33/483 |
| 2006/0084558 | A1 | | 4/2006 | Watanabe |
| 2008/0137333 | A1 | | 6/2008 | Tamaoki et al. |
| 2013/0092583 | A1 | | 4/2013 | Choi |

* cited by examiner

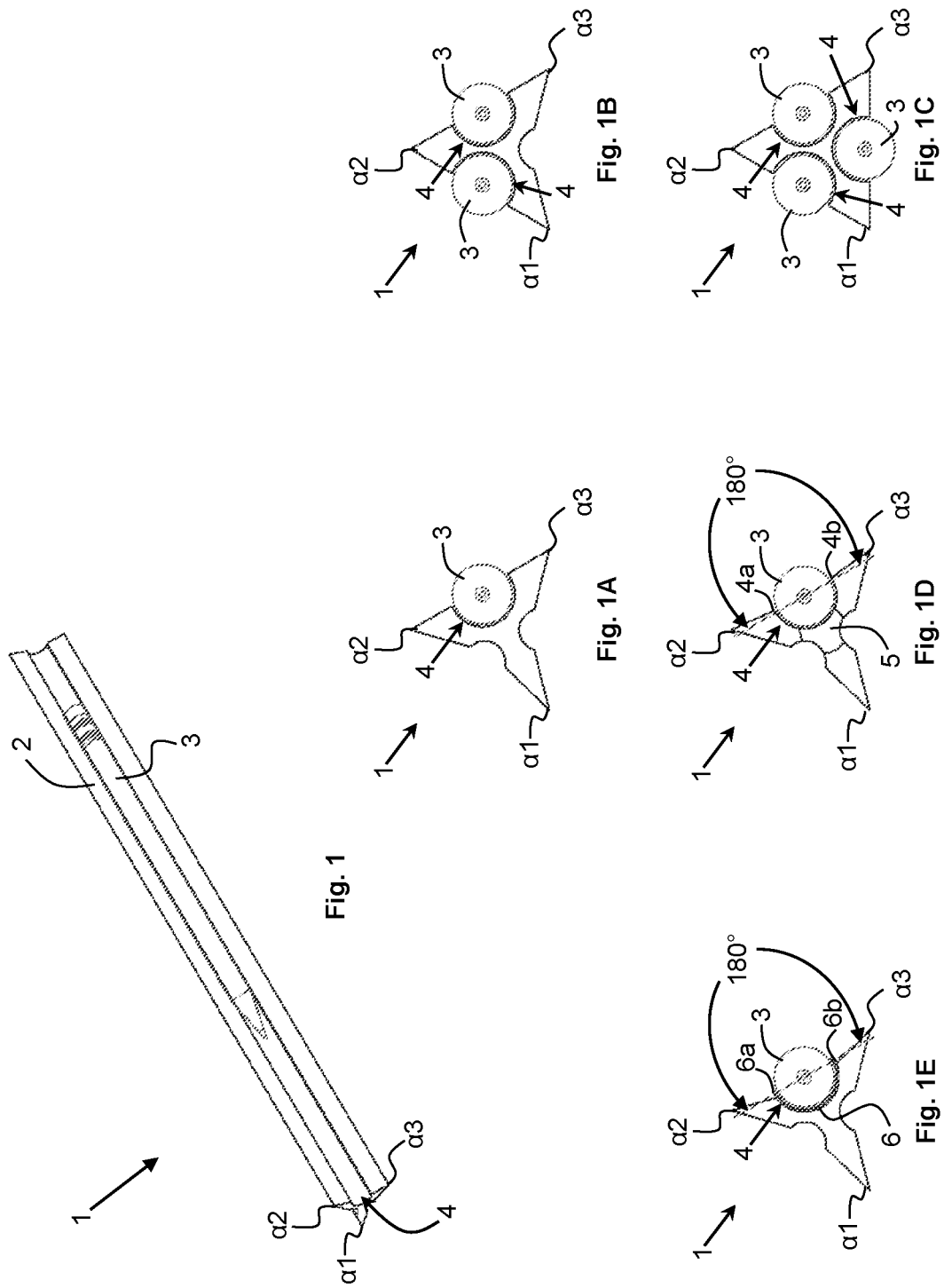

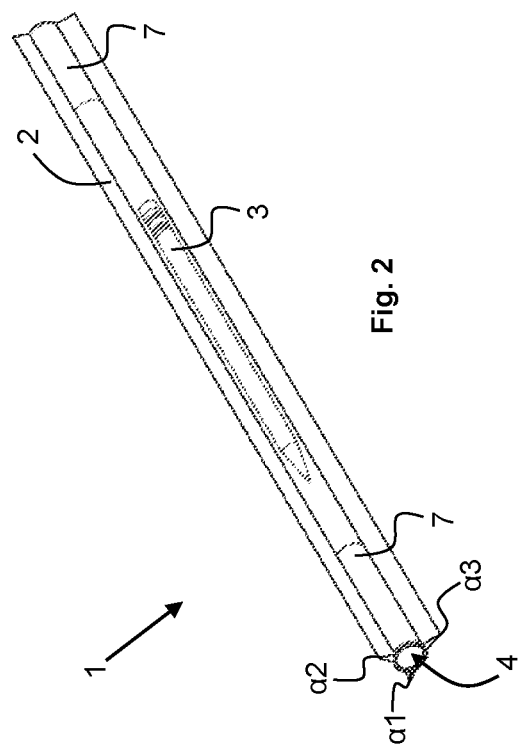
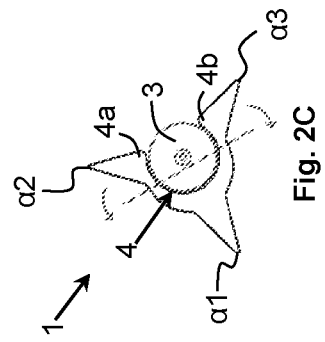
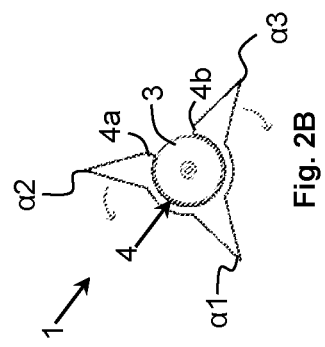
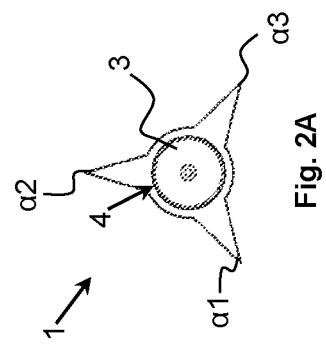

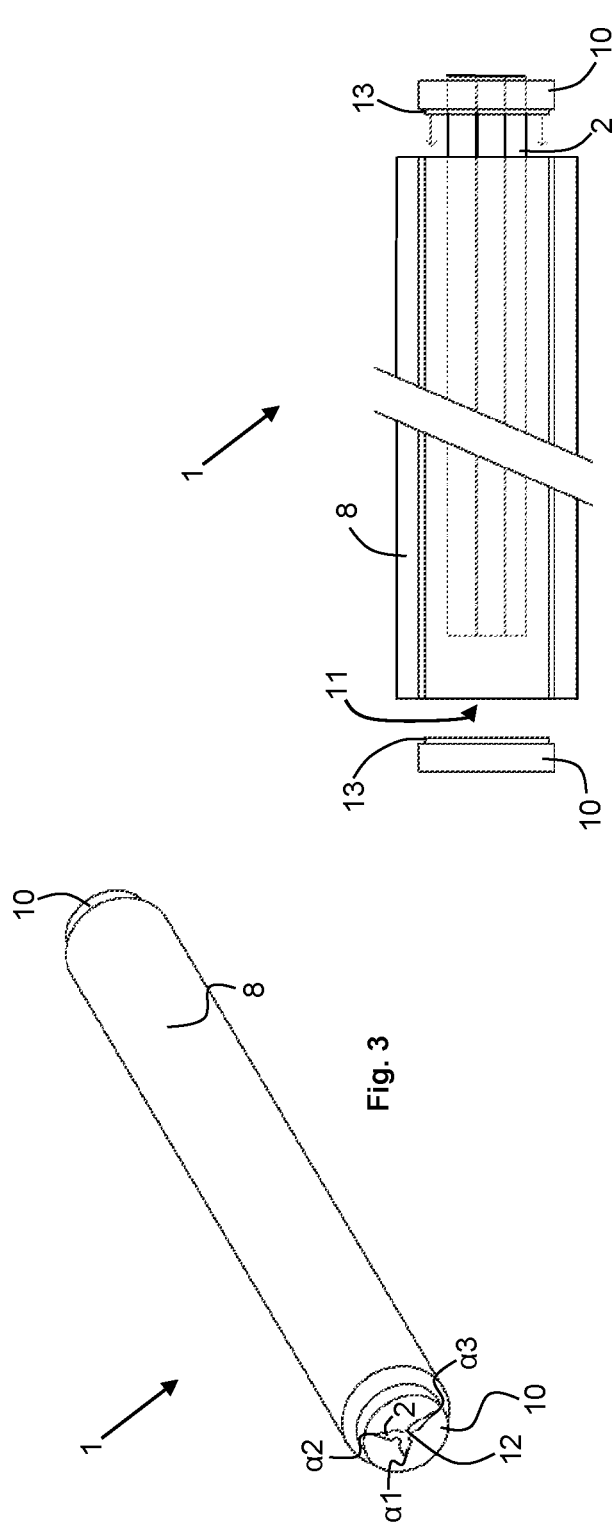
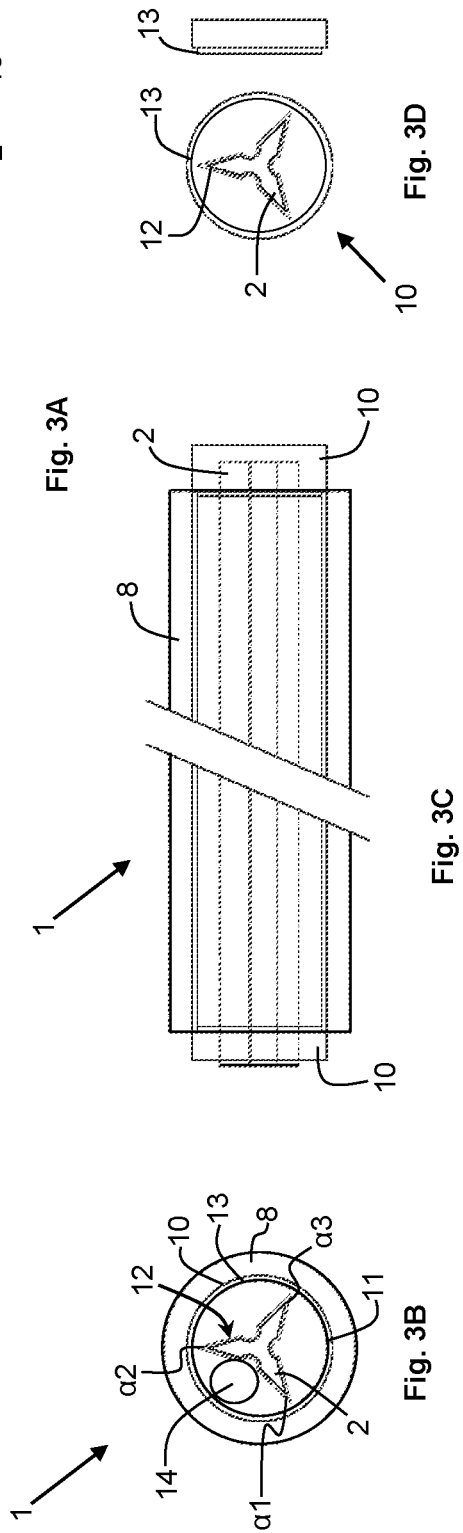

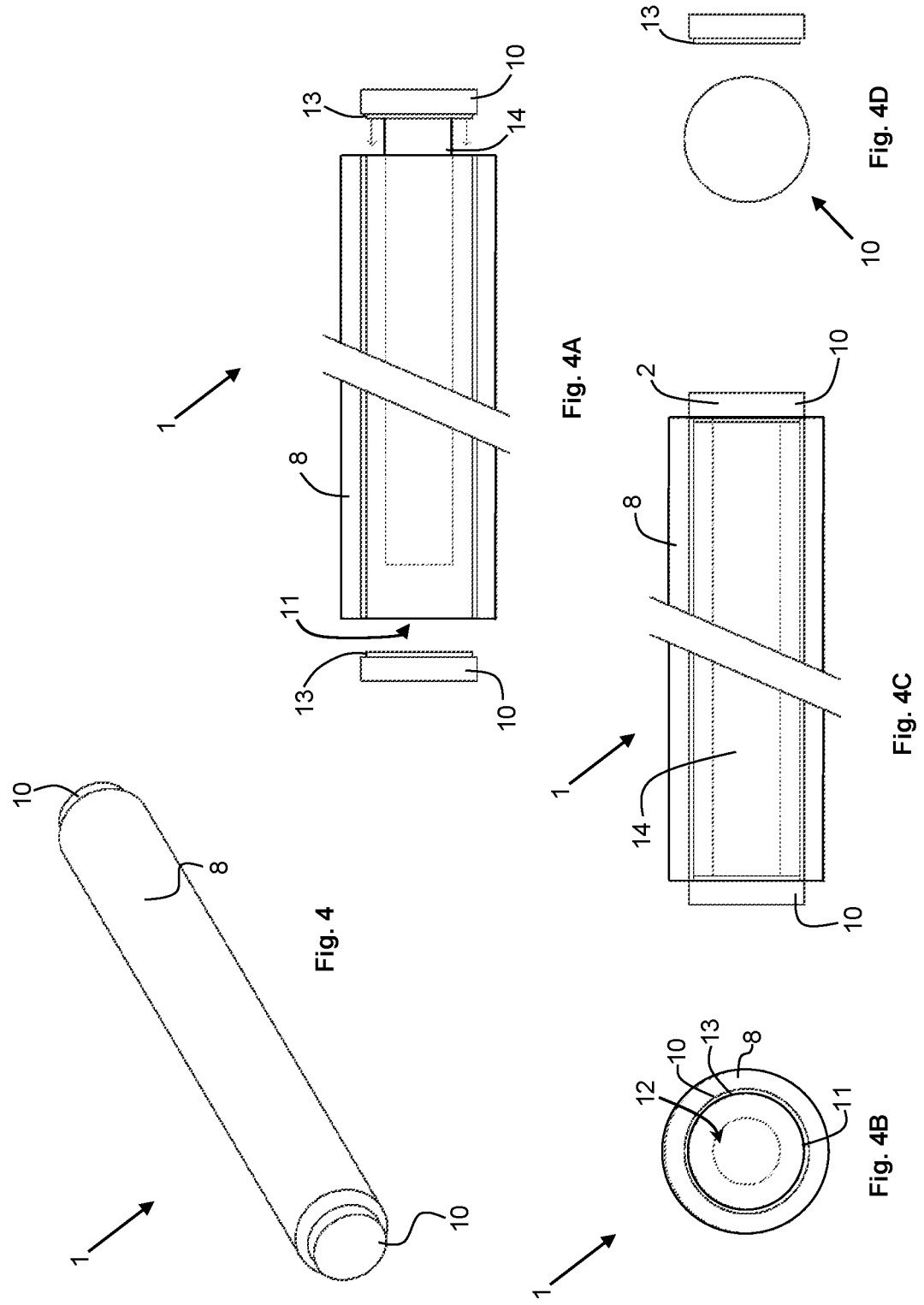

US 10,897,972 B2

STORAGE DEVICE COMBINATION FOR PENCILS, PENS, AND OTHER STATIONERY DEVICES

FIELD OF THE INVENTION

The present disclosure relates generally to a storage device for writing devices such as conventional and mechanical pencils, pens, and other stationery devices such as cylindrical utility knives.

BACKGROUND

A pencil case stores stationery such as a pencils, pens, erasers, etc. Conventional pencil cases are made from cloth, metal, or plastic and may include a zipper or other means for opening and closing the case. A fairly common pencil case design is made from metal and comprises a lid that may be opened and closed using a hinge to form an enclosure to accommodate, for example, stationery such as a pencils, pens, erasers, etc.

The above-described conventional pencil case, however, may be considered simple and boring by some. Its construction may be too plain to draw continued interest from users such as kids and students. The above-described conventional pencil case may also lack other features that may be useful to persons using stationery such as a pencils, pens, erasers, and cylindrical utility knives.

SUMMARY OF THE INVENTION

The present disclosure provides a storage device combination that may include a scale having an at least partially circular cavity such that at least a portion of a device (e.g., pencils, pens, erasers, cylindrical utility knives, etc.) fits within the cavity and is retained therein. In one embodiment, the storage device combination may include a semitransparent tube having an inner opening within which the scale may be stored and caps to enclose the semitransparent tube/scale combination to form a pencil case. In another embodiment, the storage device combination may include a light disposed within a pocket formed inside the tube such that, when the light is on, light passes through the semitransparent tube.

This novel storage device combination may be considered out of the ordinary and interesting by some, thereby keeping continued interest from users such as kids and students. The novel storage device combination may also include features such as lighting that are in addition to merely storing that may be useful to persons using stationery such as a pencils, pens, erasers, and cylindrical utility knives.

These and further features of the present invention will be described with reference to the attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the terms of the appended claims.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

FIG. 1 illustrates a perspective view of an exemplary storage device combination.

FIGS. 1A-1E illustrate cross-sections of various embodiments of the exemplary storage device combination of FIG. 1.

FIG. 2 illustrates a perspective view of an exemplary storage device combination.

FIGS. 2A-2C illustrate cross-sections of various embodiments of the exemplary storage device combination of FIG. 2.

FIG. 3 illustrates a perspective view of an exemplary storage device combination.

FIG. 3A illustrates a side view of the exemplary storage device combination of FIG. 3.

FIG. 3B illustrates an end view of the exemplary storage device combination of FIG. 3.

FIG. 3C illustrates a side view of the exemplary storage device combination of FIG. 3.

FIG. 3D illustrates front and side views of an exemplary end cap of the exemplary storage device combination of FIG. 3.

FIG. 4 illustrates a perspective view of an exemplary storage device combination.

FIG. 4A illustrates a side view of the exemplary storage device combination of FIG. 4.

FIG. 4B illustrates an end view of the exemplary storage device combination of FIG. 4.

FIG. 4C illustrates a side view of the exemplary storage device combination of FIG. 4.

FIG. 4D illustrates front and side views of an exemplary end cap of the exemplary storage device combination of FIG. 4.

DETAILED DESCRIPTION

FIG. 1 illustrates a perspective view of an exemplary storage device combination 1, which includes a scale 2 and a writing device 3. Although the illustrated writing device 3 is shown in the drawings as resembling a conventional pencil, the writing device 3 may correspond to a writing device other than a conventional pencil such as a pen, a mechanical pencil, etc. or to another cylindrically-shaped stationery device such as a utility knife (e.g., X-Acto®).

The scale 2 somewhat resembles a prior art architect/engineer scale, except that the novel scale 2 has at least one cavity 4 specifically designed to accommodate and retain in place the writing device 3. To this end, the scale 2 has an elongated body with a cross-section including three acute interior angles $\alpha 1$, $\alpha 2$, and $\alpha 3$, and the at least one cavity 4, which is at least partially circular.

FIGS. 1A-1E illustrate cross-sections of various embodiments of the exemplary storage device combination 1 of FIG. 1.

FIG. 1A illustrates a cross-section of an exemplary storage device combination 1 in which the scale 2 has one cavity 4 to accommodate and retain in place the writing device 3. The cross-section of the scale 2 includes the cavity 4, which is partially circular. The cross-section of the writing device 3 is circular and has a diameter slightly smaller than the diameter of the cavity 4 such that a portion of the pencil may fit within the cavity 4.

FIG. 1B illustrates a cross-section of an exemplary storage device combination 1 in which the scale 2 has two cavities 4 to accommodate and retain in place two writing devices 3. The cross-section of the scale 2 includes the cavities 4, which are partially circular. The cross-section of the writing devices 3 is circular and has a diameter slightly smaller than the diameter of the cavities 4 such that portions of the writing devices 3 may fit within the cavities 4.

FIG. 1C illustrates a cross-section of an exemplary storage device combination 1 in which the scale 2 has three cavities 4 to accommodate and retain in place three writing devices 3. The cross-section of the scale 2 includes the cavities 4, which are partially circular. The cross-section of the writing devices 3 is circular and has a diameter slightly smaller than the diameter of the cavities 4 such that portions of the writing devices 3 may fit within the cavities 4.

In one embodiment, the cross-section of the scale 2 includes partially circular cavities 4 of different diameters. Such a scale 2 may accommodate and retain therein writing devices 3 of different diameters. In one embodiment, the diameter of the scale's cavity 4 is slightly smaller than the diameter of the writing device 3 such that a portion of the writing device 3 fits within the cavity 4 and is retained therein by friction fit.

FIG. 1D illustrates a cross-section of an exemplary storage device combination 1 in which the scale 2 has a cavity 4 to accommodate and retain in place a writing device 3. The cross-section of the scale 2 includes the cavity 4, which is partially circular. The cross-section of the writing device 3 is circular and has a diameter slightly smaller than the diameter of the cavity 4 such that a portion of the writing device 3 may fit within the cavity 4. In the embodiment of FIG. 1D, the circumference of the at least partially circular cavity 4 extends for more than 180° forming edges 4a, 4b against which the portion of the writing device 3 may be snap fit into the cavity 4. In one embodiment, the scale 2 includes a flexible (e.g., rubber, silicone, etc.) core 5 along its elongated body. The flexible core 5 may allow the at least partially circular cavity 4 to open (i.e., the scale 2 bends) to accept a portion of the writing device 3 within the cavity 4 and partially close to retain the portion of the writing device 3 within the cavity 4.

FIG. 1E illustrates a cross-section of an exemplary storage device combination 1 in which the scale 2 has a cavity 4 to accommodate and retain in place a writing device 3. The cross-section of the scale 2 includes the cavity 4, which is partially circular. The cross-section of the writing device 3 is circular and has a diameter slightly smaller than the diameter of the cavity 4 such that a portion of the writing device 3 may fit within the cavity 4. In the embodiment of FIG. 1E, the scale 2 includes an insert or bushing 6 that has a partially circular cross-section and is inserted in the cavity 4. The insert or bushing 6 has a circumference that extends for more than 180° forming edges 6a, 6b against which the portion of the writing device 3 may be snap fit into the cavity 4.

FIG. 2 illustrates a perspective view of an exemplary storage device combination 1, which includes a scale 2 and a writing device 3. The scale 2 has a central cavity 4 specifically designed to accommodate and retain in place the writing device 3. To this end, the scale 2 has an elongated body with a cross-section including three acute interior angles α1, α2, and α3, and the at least one cavity 4, which is at least partially circular. In the illustrated embodiment, the storage device combination 1 may also include plugs 7 which may also be inserted inside the cavity 4. In one embodiment, once the writing device 3 has been inserted inside the cavity 4, the plugs 7 may be used to retain the writing device 3 inside the cavity 4. In one embodiment, one of the plugs 7 may be an eraser and another one of the plugs 7 may be a pencil sharpener, for example, or combinations thereof.

FIGS. 2A-2C illustrate cross-sections of various embodiments of the exemplary storage device combination 1 of FIG. 2.

FIG. 2A illustrates a cross-section of an exemplary storage device combination 1 in which the scale 2 has a central cavity 4 to accommodate and retain in place a writing device 3. The cross-section of the scale 2 includes the cavity 4, which is circular. The cross-section of the writing device 3 is circular and has a diameter slightly smaller than the diameter of the cavity 4 such that a portion of the writing device 3 may fit within the cavity 4. In the embodiment of FIG. 2A, the circumference of the circular cavity 4 extends 360° thus completely encircling the writing device 3 when inserted into the central cavity 4. In one embodiment, the plugs 7 may be used to retain the writing device 3 inside the cavity 4.

FIGS. 2B and 2C illustrates a cross-section of an exemplary storage device combination 1 in which the scale 2 has a central cavity 4 to accommodate and retain in place a writing device 3. The cross-section of the scale 2 includes the cavity 4, which is partially circular. The cross-section of the writing device 3 is circular and has a diameter slightly smaller than the diameter of the cavity 4 such that a portion of the writing device 3 may fit within the cavity 4. In the embodiment of FIGS. 2B and 2C, the circumference of the circular cavity 4 extends for more than 180° forming edges 4a, 4b that retain the portion of the writing device 3 in the cavity 4. In one embodiment, the scale 2 may be fabricated of a flexible material (e.g., rubber, silicone, etc.) As shown in the progression from FIG. 2B to FIG. 2C, the flexible construction of the scale 2 may allow a user to open the partially circular cavity 4 by pressing in the direction of the shown arrows for the scale 2 to slightly bend to accept a portion of the writing device 3 within the cavity 4. Upon release, the scale 2 returns to its natural state in which the cavity 4 partially closes to retain the portion of the writing device 3 within the cavity 4.

FIG. 3 illustrates a perspective view of an exemplary storage device combination 1, which includes a scale 2, a tube 8, and end caps 10. The scale 2 has an elongated body with a cross-section including three acute interior angles α1, α2, and α3. The tube 8 may be an opaque, transparent, or semitransparent cylinder. In one embodiment, the tube 8 is fabricated of semitransparent (e.g., tracing) paper rolled to form a cylinder. The tube 8 has an inner opening 11 within which a portion of the scale 2 may be stored. The caps 10 may each have an opening 12 corresponding to the cross-section of the scale 2 including three acute interior angles such that each of the caps 10 may mount to an end of the scale 2 by, for example, friction or interference fit. The caps 10 may each also have an outer diameter 13 corresponding to the inner opening 11 of the tube 8 such that each of the caps 10 may mount to an end of the tube 8 by, for example, friction or interference fit.

FIG. 3A illustrates a side view of the exemplary storage device combination 1 of FIG. 3 including the scale 2, the tube 8, and the end caps 10. The scale 2 may be stored in the inner opening 11 of the tube 8. The cap 10 on the right side is shown mounted to an end of the scale 2. The shown arrows indicate that the cap 10 on the right side may be engaged with the tube 8 with the outer diameter 13 of the cap 10 engaging the inner opening 11 of the tube 8.

FIG. 3B illustrates an end view of the exemplary storage device combination 1 of FIG. 3 including the scale 2, the tube 8, and the end cap 10. The cap 10 may have an opening 12 corresponding to the cross-section of the scale 2 including three acute interior angles such that the cap 10 may mount to an end of the scale 2. The caps 10 may each also have an outer diameter 13 corresponding to the inner opening 11 of the tube 8 such that the cap 10 may mount to an end of the tube 8.

FIG. 3C illustrates a side view of the exemplary storage device combination 1 of FIG. 3 including the scale 2, the tube 8, and the end caps 10. The scale 2 may be stored in the inner opening 11 of the tube 8. The caps 10 may be designed in at least two ways. The cap 10 on the right side of FIG. 3C is shown with the opening 12 only partially protruding through the cap 10 while the cap 10 on the left side of FIG. 3C is shown with the opening 12 protruding through the whole thickness of the cap 10.

FIG. 3D illustrates front and side views of an exemplary end cap 10. The cap 10 may have an opening 12 corresponding to the cross-section of the scale 2 including three acute interior angles such that the cap 10 may mount to an end of the scale 2. The cap 10 may also have an outer diameter 13 corresponding to the inner opening 11 of the tube 8 such that the cap 10 may mount to an end of the tube 8.

As shown in FIG. 3B, in one embodiment, the storage device combination 1 may include a light 14 disposed within a pocket formed between two of the three acute interior angles of the scale 2 and the inner opening 11 of the tube 8 such that, when the light 14 is in an on state, light emitted from the light 14 passes through the tube 8. This way, the storage device combination 1 may provide a user light for writing or reading. The light 14 may be an LED light and may be battery-powered, USB (or similar) powered, or combinations thereof.

In one embodiment, the tube 8 is formed of "Lightpaper" such as the distributed LED array commercialized by Rohinni LLC of Coeur d'Alene, Idaho rolled into a cylinder such that, when the LED paper is in an on state, light emits from the tube 8. This way, the storage device combination 1 may provide a user light for writing or reading.

In one embodiment, it is the caps 10 (or at least one of the caps 10) instead of or in addition to the tube 8 that is transparent or semitransparent such that the light produced by the light 14 may pass through the caps 10.

FIG. 4 illustrates a perspective view of an exemplary storage device combination 1, which includes a tube 8 and end caps 10. The tube 8 may be a transparent, or semitransparent cylinder. In one embodiment, the tube 8 is fabricated of semitransparent (e.g., tracing) paper rolled to form a cylinder. The tube 8 has an inner opening 11 within which a light 14 may be stored. The caps 10 may each have an opening 12 corresponding to the cross-section of the light 14 such that each of the caps 10 may mount to an end of the light 14. The caps 10 may each also have an outer diameter 13 corresponding to the inner opening 11 of the tube 8 such that each of the caps 10 may mount to an end of the tube 8. The light 14 may be stored in a pocket formed within the inner opening 11 of the tube 8 such that, when the light 14 is in an on state, light emitted from the light 14 passes through the tube 8.

FIG. 4A illustrates a side view of the exemplary storage device combination 1 of FIG. 4 including the tube 8, the end caps 10, and the light 14. The light 14 may be stored in the inner opening 11 of the tube 8. The cap 10 on the right side is shown mounted to an end of the light 14. The shown arrows indicate that the cap 10 on the right side may be engaged with the tube 8 with the outer diameter 13 of the cap 10 engaging the inner opening 11 of the tube 8.

FIG. 4B illustrates an end view of the exemplary storage device combination 1 of FIG. 4 including the tube 8, the end cap 10, and the light 14. The cap 10 may have an opening 12 corresponding to the cross-section of the light 14 such that the cap 10 may mount to an end of the light 14. The caps 10 may each also have an outer diameter 13 corresponding to the inner opening 11 of the tube 8 such that the cap 10 may mount to an end of the tube 8.

FIG. 4C illustrates a side view of the exemplary storage device combination 1 of FIG. 4 including the tube 8, the end caps 10, and the light 14. The light 14 may be stored in the inner opening 11 of the tube 8. The openings 12 of the caps 10 may only partially protrude through the caps 10 to retain the light 14 in place.

FIG. 4D illustrates front and side views of an exemplary end cap 10. The cap 10 may have an outer diameter 13 corresponding to the inner opening 11 of the tube 8 such that the cap 10 may mount to an end of the tube 8.

The light 14 is disposed within a pocket formed in the inner opening 11 of the tube 8 such that, when the light 14 is in an on state, light emitted from the light passes through the transparent or semitransparent tube 8. This way, the storage device combination 1 may provide a user light for writing or reading. The light 14 may be an LED light and may be battery-powered, USB (or similar) powered, or combinations thereof.

In one embodiment, the tube 8 is formed of "Lightpaper" such as the distributed LED array commercialized by Rohinni LLC of Coeur d'Alene, Idaho rolled into a cylinder such that, when the LED paper is in an on state, light emits from the tube 8. This way, the storage device combination 1 may provide a user light for writing or reading.

In one embodiment, it is the caps 10 (or at least one of the caps 10) instead of or in addition to the tube 8 that is transparent or semitransparent such that the light produced by the light 14 may pass through the caps 10.

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (3D. Ed. 1995).

What is claimed is:

1. A storage device combination, comprising:
    a scale having an elongated body with a cross-section including (a) three acute interior angles and (b) at least one partially circular cavity with a first diameter, the at least one partially circular cavity having an opening projecting in a direction at least substantially normal to the cross-section of the elongated body, the opening extending at least a majority of the length of the elongated body; and
    a device having an elongated body with a circular cross-section of a second diameter, the first diameter corresponding to the second diameter such that at least a portion of the device fits within the at least one at least partially circular cavity and is retained therein.

2. The storage device combination of claim 1, wherein the cross-section of the scale's elongated body includes two or three at least partially circular cavities with the first diameter.

3. The storage device combination of claim 1, wherein the cross-section of the scale's elongated body includes at least a second at least partially circular cavity with a third diameter different from the first diameter, and the storage device combination includes a second device having an elongated body with a circular cross-section of a fourth diameter larger than the second diameter, the third diameter corresponding to the fourth diameter such that at least a portion of the second device fits within the second at least one at least partially circular cavity and is retained therein.

4. The storage device combination of claim 1, wherein the first diameter is slightly smaller than the second diameter such that the portion of the device fits within the at least one at least partially circular cavity and is retained therein by friction fit.

5. The storage device combination of claim 1, wherein circumference of the at least partially circular cavity extends for more than 180° forming edges against which the portion of the device is snap fit into the cavity.

6. The storage device combination of claim 1, wherein at least a portion of the elongated body of the scale is fabricated of a flexible material such that the at least partially circular cavity opens to accept the portion of the device within the cavity and partially closes to retain the portion of the device within the cavity.

7. The storage device combination of claim 1, wherein the device is a pen, a pencil, or a cylindrically-shaped knife.

8. The storage device combination of claim 1, comprising:
    a tube having an inner opening within which the scale and the device, retained within the at least one at least partially circular cavity of the scale, reside.

9. The storage device combination of claim 1, comprising:
    a transparent or semitransparent tube having an inner opening within which the scale and the device, retained within the at least one at least partially circular cavity of the scale, reside.

10. The storage device combination of claim 1, comprising:
    a tube fabricated from semitransparent paper rolled to form a cylinder having an inner opening within which the scale and the device, retained within the at least one at least partially circular cavity of the scale, reside.

11. The storage device combination of claim 1, comprising:
    a tube having an inner opening within which the scale and the device, retained within the at least one at least partially circular cavity of the scale, reside; and
    at least one cap having an opening corresponding to the scale's cross-section including three acute interior angles and at least one at least partially circular cavity with the first diameter such that the at least one cap mounts to an end of the scale.

12. The storage device combination of claim 1, comprising:
    a tube having an inner opening within which the scale and the device, retained within the at least one at least partially circular cavity of the scale, reside; and
    at least one cap having:
        an opening corresponding to the scale's cross-section including three acute interior angles and at least one at least partially circular cavity with the first diameter such that the at least one cap mounts to an end of the scale, and
        an outer diameter corresponding to the inner opening of the tube such that the at least one cap mounts to an end of the tube.

13. The storage device combination of claim 1, comprising:
    a tube having an inner opening within which the scale and the device, retained within the at least one at least partially circular cavity of the scale, reside; and
    at least one cap having:
        an opening corresponding to the scale's cross-section including three acute interior angles and at least one at least partially circular cavity with the first diameter such that the at least one cap mounts to an end of the scale, and
        an outer diameter corresponding to the inner opening of the tube such that the at least one cap mounts to an end of the tube by snap fit or friction fit.

14. The storage device combination of claim 1, comprising:
    a semitransparent tube having an inner opening within which the scale and the device, retained within the at least one at least partially circular cavity of the scale, reside;
    at least one cap having:
        an opening corresponding to the scale's cross-section including three acute interior angles and at least one at least partially circular cavity with the first diameter such that the at least one cap mounts to an end of the scale, and
        an outer diameter corresponding to the inner opening of the tube such that the at least one cap mounts to an end of the tube; and
    a light disposed within a pocket formed between two of the three acute interior angles of the scale and the inner opening of the tube such that when the light is in an on state light emitted from the light passes through the semitransparent tube.

15. A storage device combination, comprising:
    a scale having an elongated body with a cross-section perpendicular to a longest dimension of the elongated body, the cross-section including (a) three acute interior angles and (b) at least one partially circular cavity having (i) a first diameter and (ii) an opening projecting in a direction at least substantially normal to the cross-section of the elongated body, the opening extending at least a majority of the length of the elongated body; and a device having an elongated body with a cross-section of a second diameter, wherein the first diameter is slightly smaller than the second diameter such that at least a portion of the device fits within the at least one partially circular cavity and is retained therein.

\* \* \* \* \*